(12) United States Patent
Polineni et al.

(10) Patent No.: US 10,925,286 B2
(45) Date of Patent: Feb. 23, 2021

(54) SYNERGISTIC CHALCONE CONTAINING COMPOSITION OF A NEMATICIDE

(71) Applicant: TELLURIS BIOTECH INDIA PRIVATE LIMITED, Telangana (IN)

(72) Inventors: Venu Polineni, Telangana (IN); Alejandro Calderón Urrea, Fresno, CA (US); Glenda W. Polack, Fresno, CA (US)

(73) Assignee: TELLURIS BIOTECH INDIA PRIVATE LIMITED, Telangana (IN)

( * ) Notice: Subject to any disclaimer, the term of this patent is extended or adjusted under 35 U.S.C. 154(b) by 0 days.

(21) Appl. No.: 16/495,007

(22) PCT Filed: Mar. 17, 2018

(86) PCT No.: PCT/IB2018/051784
§ 371 (c)(1),
(2) Date: Sep. 17, 2019

(87) PCT Pub. No.: WO2018/167734
PCT Pub. Date: Sep. 20, 2018

(65) Prior Publication Data
US 2020/0236948 A1    Jul. 30, 2020

(30) Foreign Application Priority Data

Mar. 17, 2017 (IN) .............................. 201741009366

(51) Int. Cl.
*A01N 63/50* (2020.01)
*A01N 35/06* (2006.01)
*A01N 43/10* (2006.01)

(52) U.S. Cl.
CPC .............. *A01N 63/50* (2020.01); *A01N 35/06* (2013.01); *A01N 43/10* (2013.01)

(58) Field of Classification Search
CPC ........ A01N 63/50; A01N 35/06; A01N 43/10; A01N 37/46
See application file for complete search history.

(56) References Cited

U.S. PATENT DOCUMENTS

| 7,071,302 B1 | 7/2006 | Horvitz et al. |
| 9,125,413 B1 * | 9/2015 | Calderon-Urrea ....... C07K 7/06 |

FOREIGN PATENT DOCUMENTS

EP    1051910 A2    11/2000

OTHER PUBLICATIONS

Attar et al, Bioorganic & Medicinal Chemistry, 2011, 19, 2055-2073 (Year: 2011).*
PCT/IB2018/051784 International Search Report dated Sep. 14, 2018.
PCT/IB2018/051784 Written Opinion completed Aug. 28, 2018.

* cited by examiner

*Primary Examiner* — Sudhakar Katakam
(74) *Attorney, Agent, or Firm* — Venable LLP; Keith G. Haddaway

(57) ABSTRACT

The present invention provides a synergistic composition of a nematicide comprising of a nematicidal peptide, and chalcones, wherein the nematicidal peptide is derived from CED-4 protein sequence is either, Peptide 2, or Peptide 3, or Peptide 12; and chalcones are either chalcone 17, chalcone 25, or chalcone 30. The nematicidal peptides alone show 100% nematicidal activity at a concentration of 1 mg/ml, whereas, when combined with chalcones, 100% nematicidal activity is seen at concentration as low as 0.8 mg/ml bringing a synergistic effect. Another embodiment of the invention provides a method for preparing working solutions of chalcones in aqueous solvents such as water by diluting the stock solution of chalcones, prepared in dimethyl sulfoxide, serially in ethanol and water. The final concentration of chalcone is around $10^{-4}$-$10^{-5}$ M in the nematicidal composition. This synergistic nematicidal composition is environmentally safe and non-toxic to humans and animals.

16 Claims, 5 Drawing Sheets
Specification includes a Sequence Listing.

SYNERGISTIC CHALCONE CONTAINING COMPOSITION OF A NEMATICIDE

FIELD OF THE INVENTION

The present invention relates to nematicides, which are compositions used in agricultural field for killing plant parasites, specifically nematodes. More specifically, the invention relates to a synergistic composition of a nematicide comprising of a nematicidal peptide derived from CED-4 protein, and chalcones.

BACKGROUND OF THE INVENTION

Nematodes are a major threat to the agricultural industry as they cause heavy losses to the yield, thereby, affecting the economy in a significant way. Nematodes are second to insects which are known to cause serious damage to crops such as tomatoes and other vegetables, citrus fruits, potatoes, rice, coconuts, wheat and other cereals, ornamental plants and others. Nematodes alone or in combination with other soil microorganisms have been found to attack almost every part of the plant including roots, stems, leaves, fruits and seeds. They cause a projected yield loss of 12.3% ($157 billion dollars) worldwide. Out of which $40.3 million is reported from India (Singh et al., 2015).

Root-knot nematodes which belong to the *Meloidogyne* genus are one of the three most economically damaging genera of plant-parasitic nematodes on horticultural and field crops. They are obligate parasites of the roots of several plants; and *Meloidogyne incognita* is amongst the major pest worldwide.

Nematicides are compositions which are used to kill these plant parasites, the nematodes. Most of the nematicides used are chemical compositions which are highly toxic to humans and are also detrimental to useful soil bacteria. Several nematicides have also shown to contaminate groundwater, and cause depletion of the ozone layer. One of the well-known nematicide, methyl-bromide, has been banned in several countries including USA and India. Another highly toxic nematicide which is widely used in field crops is carbofuran; a single grain of carbofuran can kill birds within few minutes. Nematicides such as phorate can easily go through the soil into the groundwater and contaminate it.

The severe drawbacks associated with chemical nematicides necessitate the development of novel technologies for controlling nematodes. One such method is generating transgenic plant lines which express the transgenic genes for resistance against nematodes. However, this is time consuming and expensive method which requires extensive prior research activities. In many countries including India, there is fierce objection to introduction of transgenic lines based on several moral, ethical and unseen environmental issues.

One effective method involves generation of compositions of nematicides which are environmentally safe, non-toxic, and easy to generate and use.

U.S. Pat. No. 9,125,413B1 describes peptides derived from CED-4 protein which show potent nematicidal activity. CED-4 protein consisting of amino acids of SEQ ID NO. 1, belongs to the family of apoptosis proteins. The SEQ ID NO. 1 comprises:

```
MLCEIECRALSTAHTRLIHDFEPRDALTYLEGKNIFTEDHSELISKMSTR

LERIANFLRIYRRQASELGPLIDFFNYNNQSHLADFLEDYIDFAINEPDL
```
-continued
```
LRPVVIAPQFSRQMLDRKLLLGNVPKQMTCYIREYHVDRVIKKLDEMCDL

DSFFLFLHGRAGSGKSVIASQALSKSDQLIGINYDSIVVVLKDSGTAPKS

TFDLFTDILLMLKSEDDLLNFPSVEHVTSVVLKRMICNALIDRPNTLFVF

DDVVQEETIRWAQELRLRCLVTTRDVEISNAASQTCEFIEVTSLEIDECY

DFLEAYGMPMPVGEKEEDVLNKTIELSSGNPATLMMFFKSCEPKTFEKMA

QLNNKLESRGLVGVECITPYSYKSLAMALQRCVEVLSDEDRSALAFAVVM

PPGVDIPVKLWSCVIPVDICSNEEEQLDDEVADRLKRLSKRGALLSGKRM

PVLTFKIDHIIHMFLKHVVDAQTIANGISILEQRLLEIGNNNVSVPERHI

PSHFQKFRRSSASEMYPKTTEETVIRPEDFPKFMQLHQKFYDSLKNFAC
```
c.

Three peptides derived from SEQ ID NO. 1 were shown to have nematicidal activity at effective concentrations of about 1 mg/ml, the peptides comprising of the following sequences:
1) Peptide 2 consisting of 15 amino acids DLLRPVVIAPQFSRQ (99-113 amino acid stretch, SEQ ID NO. 2),
2) Peptide 3 consisting of 19 amino acids RQMLDRKLLLGNVPKQMTC (112-130 amino acid stretch, SEQ ID NO. 3), and
3) Peptide 12 consisting of 12 amino acids FPKFMQLHQKFY (529-540 amino acid stretch, SEQ ID NO. 4).

The present invention takes into account the drawbacks of prior art and provides a method for controlling nematodes using anti-parasitic peptides and a group of compounds, chalcones, which are non-toxic and environmentally safe.

OBJECT OF THE INVENTION

Accordingly, the main object of the invention is to provide a composition of a nematicide which is environmentally safe, easy to generate and use.

Another object of the invention is to provide a synergistic nematicidal composition comprising:
1. at least one peptide, Peptide 2, Peptide 3, or Peptide 12, derived from CED-4 protein, wherein,
   a. Peptide 2, a 15 amino acids long peptide comprising of the sequence DLLRPVVIAPQFSRQ (SEQ ID NO. 2),
   b. Peptide 3, a 19 amino acid long comprising of the sequence RQMLDRKLLLGNVPKQMTC (SEQ ID NO. 3), and
   c. Peptide 12, a 12 amino acids long comprising of the sequence FPKFMQLHQKFY (SEQ ID NO. 4);
   And
2. at least one chalcone belonging to the group of compounds, chalcones, wherein the chalcone is either chalcone 17, chalcone 25, or chalcone 30.

Yet another object of the invention is to provide a synergistic nematicidal composition which shows nematicidal activity, wherein the concentration of the peptides is less than 1 mg/ml, and the concentration of the chalcones is in the range of $10^{-4}$-$10^{-5}$ M.

Yet another object of the invention is to provide a method for dissolving chalcones and providing working solutions of chalcones in aqueous solvents such as water for use as a nematicide.

Yet another object of the invention is to provide a synergistic nematicidal composition which is non-toxic to humans.

Yet another object of the invention is to provide synergistic nematicidal composition which does not have broad-spectrum activity and is not detrimental to soil microorganisms.

Yet another object of the invention is to provide synergistic nematicidal composition which is easy to synthesize, does not require generation of transgenic plants, and is highly economical.

SUMMARY OF THE INVENTION

The present invention relates to a composition of a nematicide used in agricultural purposes for killing of plant parasites, specifically nematodes. More specifically, invention relates to a synergistic composition of a nematicide comprising of nematicidal peptides and chalcones.

In the main embodiment of the invention the invention provides a composition of the nematicide comprising:
1. at least one peptide, Peptide 2, Peptide 3, or Peptide 12, derived from CED-4 protein, wherein,
   a. Peptide 2, a 15 amino acids long peptide comprising of the sequence DLLRPVVIAPQFSRQ (SEQ ID NO. 2),
   b. Peptide 3, a 19 amino acid long comprising of the sequence RQMLDRKLLLGNVPKQMTC (SEQ ID NO. 3), and
   c. Peptide 12, a 12 amino acids long comprising of the sequence FPKFMQLHQKFY (SEQ ID NO. 4); and
2. at least one chalcone belonging to the group of compounds, chalcones or chalconoids, wherein the chalcone is either chalcone 17 {(2E)-1-(2,4-Dichlorophenyl)-3-phenyl-2-propen-1-one}, chalcone 25 {(2E)-1-(4-Ethoxyphenyl)-3-phenyl-2-propen-1-one, or chalcone 30 {(2E)-3-Phenyl-1-(2-thienyl)-2-propen-1-one}.

The peptides, Peptide 2, Peptide 3, and Peptide 12, individually show 100% nematicidal activity at concentrations as low as 1 mg/ml. However, the combination of either of the peptides with chalcones, chalcone 17, chalcone 25, or chalcone 30 acts in a synergistic manner and reduces the concentration of the peptides to 0.8 mg/ml for 100% nematicidal activity, wherein the concentration of chalcones is as low as $10^{-4}$-$10^{-5}$ M. Significant reduction in the amount of peptide required for activity greatly reduces the cost of production, thereby making the unique composition highly economical.

Chalcones are complex organic compounds which are not easily soluble in aqueous solvents such as water. Organic solvents such as dimethyl sulfoxide and ethanol are generally used for dissolving chalcones. However, these solvents are toxic to humans and animals and are also environmentally hazardous.

Therefore, in another embodiment of the invention, the invention provides a method for dissolving concentrated chalcone stock in water by serial dilution method, wherein the chalcone stock is prepared in DMSO and is then serially diluted in ethanol followed by water for preparing a working solution as a nematicide. The working solution of chalcones is in the range of $10^{-4}$-$10^{-5}$ M, wherein the final concentration of DMSO and ethanol ranges between 0.01-0.1% and 0.5-5%, respectively, which is environmentally safe and non-toxic to humans and animals.

DETAILED DESCRIPTION OF THE INVENTION

Figure 1:
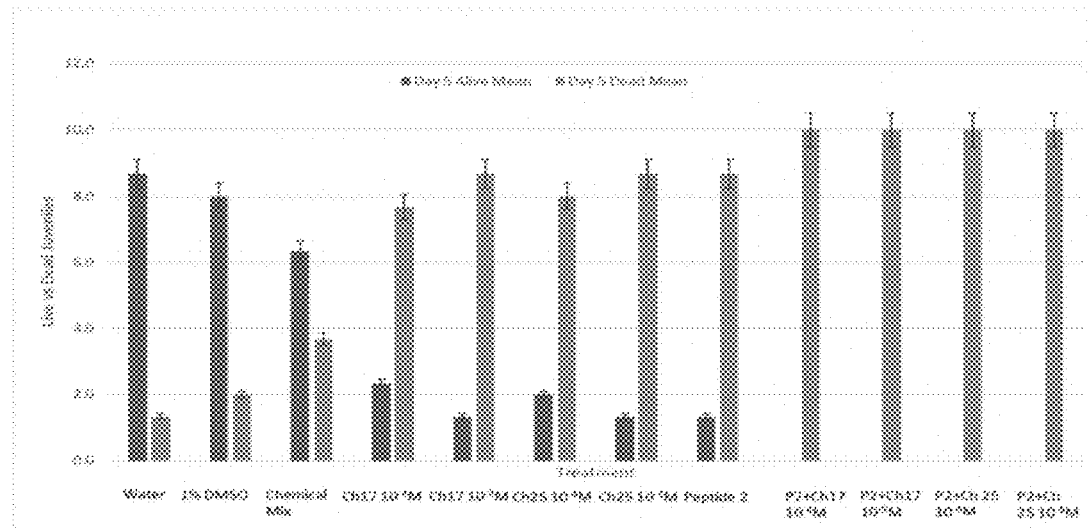
FIG. 1 depicts a graphical representation of effect of Peptide 2 in combination with chalcone 17, or chalcone 25 on nematodes in a 96-well plate experiment.

The present invention will now be described more fully hereinafter. This invention may, however, be embodied in many different forms and should not be construed as being limited to the embodiment set forth herein. Rather, the embodiment is provided so that this disclosure will be thorough, and will fully convey the scope of the invention to those skilled in the art.

Chalcones or chalconoids are a group of compounds that have central core comprising of an aromatic ketone and an enone. Benzylideneacetophenone is the parent member of the chalcone series. Chalcones and their derivatives are molecules with broad-spectrum of biological activities such as anti-retroviral, anti-inflammatory, anti-parasitic, anti-malarial, anti-oxidant, anti-fungal, anti-protozoal, anti-bacterial, anti-steroidal, cardioprotective, anti-tumor, anti-cancer etc. Several types of chalcones are known to exist naturally in a variety of dicotyledonous plants, and in some monocotyledonous plants, pteridophytes and gymnosperms.

Chalcone, (2E)-1,3-Diphenylprop-2-en-1-one, has a chemical formula $C_{15}H_{12}O$, and other chalcones are generally derivatives of this parent compound with a structure of Formula X:

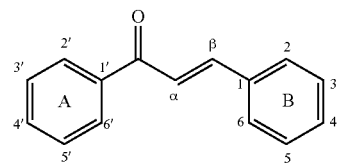

FORMULA X

Chalcone structure is composed of two aromatic rings, Ring A and Ring B, that are joined by a three-carbon α,β-unsaturated carbonyl system. At least thirty naturally occurring chalcones are known with several types of chemical groups attached to Ring A or B.

Table 1 provides the structures of thirty several types of chalcones, chalcone 1 to chalcone 30, wherein the basic structure is that provided in Formula X.

TABLE 1

Name and structure of naturally occurring chalcones

Name of chalcone and its structure
(Variation in Ring B)

Type 1

| Name | Structure of Ring B |
|---|---|
| 1 | (phenyl) |
| 2 | (2-methylphenyl, $H_3C$) |
| 3 | (1-naphthyl) |
| 4 | (2-naphthyl) |
| 5 | (2-chlorophenyl, $Cl$) |
| 6 | (4-nitrophenyl, $NO_2$) |
| 7 | (2-methoxyphenyl, $MeO$) |
| 8 | (2-diphenylphosphinophenyl, $Ph_2P$) |
| 9 | (2-pyridyl, N) |
| 10 | (3-pyridyl, N) |
| 11 | (4-pyridyl, N) |

Name of chalcone and its structure
(Variation in Ring A)

Type 2

| Name | Structure of Ring A |
|---|---|
| 12 | (2-methylphenyl, $CH_3$) |
| 13 | (1-naphthyl) |
| 14 | (2-naphthyl) |
| 15 | (2-chlorophenyl, $Cl$) |
| 16 | (3-chlorophenyl, $Cl$) |
| 17 | (2,4-dichlorophenyl, $Cl$, $Cl$) |
| 18 | (4-fluorophenyl, $F$) |

TABLE 1-continued

Name and structure of naturally occurring chalcones

| # | Structure |
|---|---|
| 19 | 2,4-difluorophenyl |
| 20 | 4-nitrophenyl |
| 21 | 2-methoxyphenyl |
| 22 | 2,4-dimethoxyphenyl |
| 23 | 3,4-dimethoxyphenyl |
| 24 | 3,4,5-trimethoxyphenyl |
| 25 | 4-ethoxyphenyl |
| 26 | 4-butoxyphenyl |
| 27 | 2-pyridyl |
| 28 | 3-pyridyl |
| 29 | 2-furyl |
| 30 | 2-thienyl |

Attar et. al., have shown that chalcones are known to have nematicidal activity, however, the efficacy of individual chalcones varies a lot, ranging from as low as 5% to as high as 100% nematicidal activity at different concentrations. Moreover, the effect of chalcones was tested only on the non-parasitic model nematode *Caenorhabditis elegans*. The activity of individual chalcones was seen at concentrations higher than $10^{-2}$ M. The use of higher concentrations of compounds for minimum inhibitory effect becomes very limited due to toxicity, soil contamination, seepage to ground water, and other related problems.

A group of chalcones can be collectively presented as structural Formula 1:

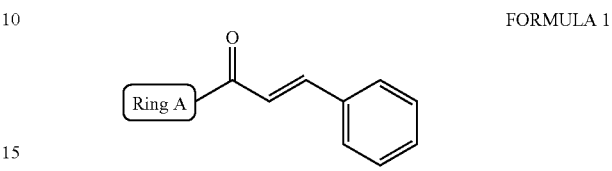

FORMULA 1

Chalcone 17 has the chemical name (2E)-1-(2,4-Dichlorophenyl)-3-phenyl-2-propen-1-one and formula as shown in Formula 2:

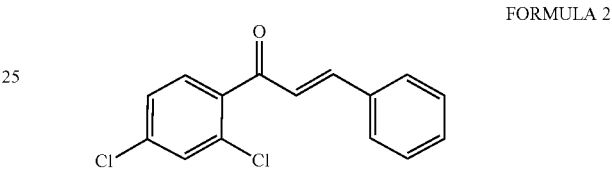

FORMULA 2

Chalcone 25 has the chemical name (2E)-1-(4-Ethoxyphenyl)-3-phenyl-2-propen-1-one and formula as shown in Formula 3:

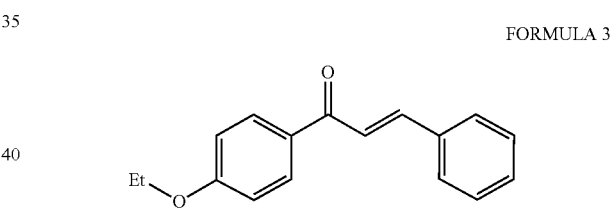

FORMULA 3

Chalcone 30 has the chemical name (2E)-3-Phenyl-1-(2-thienyl)-2-propen-1-one and formula as shown in Formula 4:

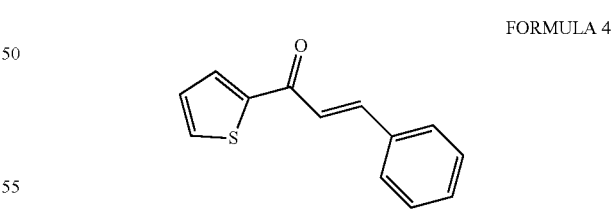

FORMULA 4

Chalcones and chalcone-like structures exist naturally in many plants, it makes them eco-friendly; and their association with several biological activities greatly increases their potential use in agriculture. However, the major limitation of chalcones is their solubility. Chalcones are not easily soluble in aqueous solvents such as water and consequently have to be dissolved in an organic solvent such as dimethyl sulfoxide (DMSO). DMSO is considered to be toxic to humans and animals with acute oral toxicity (LD50) of 7920 mg/kg [mouse] and acute dermal toxicity (LD50) of 40000 mg/kg

[rat]. Hence, chalcones dissolved in DMSO are not suitable for direct application to soils as it is hazardous to users and animals coming in touch with it. Similarly, another solvent ethanol has a acute oral toxicity (LD50) of 7060 mg/kg [rat] which is also not safe for users. Therefore, a method for using chalcones in an environmentally safe solution is required.

The present invention relates to a synergistic composition which has ability to kill plant parasites, specifically, nematodes. More specifically, the present invention relates to a synergistic composition of a nematicide comprising of a nematicidal peptide, and chalcones, wherein, the peptide is derived from the CED-4 protein sequence. The combination of a nematicidal peptide and chalcones is unique, and economical compared to other existing safe methods for nematode control such as generation of transgenic lines. Though, the peptides individually show nematicidal activity, the combination with chalcones increases the efficiency and brings a synergistic effect, and also reduces the amount of peptide required for activity, thus, reducing the cost of production of the composition.

In the main embodiment of the present invention, the invention provides a synergistic composition of a nematicide comprising of:
1. at least one peptide, Peptide 2, Peptide 3, or Peptide 12, derived from CED-4 protein, wherein,
    a) Peptide 2, a 15 amino acids long peptide comprising of the sequence DLLRPVVIAPQFSRQ (SEQ ID NO. 2),
    b) Peptide 3, a 19 amino acid long comprising of the sequence RQMLDRKLLLGNVPKQMTC (SEQ ID NO. 3), and
    c) Peptide 12, a 12 amino acids long comprising of the sequence FPKFMQLHQKFY (SEQ ID NO. 4); and
2. at least one chalcone belonging to the group of compounds, chalcones or chalconoids, wherein the chalcone is either chalcone 17 {(2E)-1-(2,4-Dichlorophenyl)-3-phenyl-2-propen-1-one}, or chalcone 25 {(2E)-1-(4-Ethoxyphenyl)-3-phenyl-2-propen-1-one.

The peptides show 100% nematicidal activity at a peptide concentration of 0.8 mg/ml when combined with at least one chalcone of Formula 2-4. The chalcones also showed 100% nematicidal acidity at concentrations as low as $10^{-4}$-$10^{-5}$ M in combination with peptides SEQ ID NO 2-4. The combination of the nematicidal peptides SEQ ID No. 2-4 with chalcones of Formula 2-4 brings a synergistic effect and the combination works at a lower concentration compared to the peptides alone.

Chalcones are not easily soluble in water or other aqueous solutions which makes their usability quite limited. Dissolving chalcones in non-aqueous solutions makes them less environment-friendly. Generally, chalcones are dissolved in organic solvents such as DMSO and ethanol which are highly toxic to humans and animals.

Therefore, in another embodiment of the invention, the invention provides a method for using chalcones in an environmentally safe solution with minimal DMSO and ethanol concentrations. The working solution of chalcones is made in aqueous solvent such as water in steps comprising of:
1. making a stock solution of chalcone in DMSO at the concentration of $10^{-1}$ M, for e.g. by adding 13.8 mg of chalcone 17 or 12.65 mg of chalcone 25 in 1000 µl of DMSO;
2. diluting the chalcone stock in 100% ethanol to prepare a chalcone solution with $10^{-2}$ M concentration, for e.g. adding 100 µl of chalcone stock from step 1 to 900 µl of 100% ethanol;
3. diluting the chalcone solution from step 2 in 50% ethanol in water solution to get a chalcone solution with $10^{-3}$ M concentration, for e.g. adding 100 µl of chalcone solution from step 2 to 900 µl of 50% ethanol in water solution; and
4. diluting chalcone solution from step 3 in plain distilled water to get an aqueous chalcone solution with $10^{-4}$ M concentration as the working solution, for e.g adding 1 mL of chalcone solution from step 2 to 900 mL of 50% ethanol in water solution followed by further diluting the solution in distilled water for obtaining lower concentrations of chalcone solution such as $10^{-5}$ M or less;

wherein, the final concentration of DMSO and ethanol in the working solution of chalcones is between 0.01-0.1% and 0.5-5%, respectively, which is significantly less than the lethal concentrations of the solvents. This method provides a dilution method for dissolving chalcones in aqueous solutions at concentrations less than $10^{-4}$ M.

EXAMPLE 1

A) *M. incognita* Propagation

Tomato plants were inoculated with *M. incognita* juveniles and maintained in a growth chamber. After at least two months, the *M. incognita* eggs were extracted from the roots for experiments. The procedure followed for extracting *M. incognita* eggs is explained below.

The root tissues were either chopped by hand using a surgical blade and a watch glass, or it was chopped up using a food processor. The chopped tissue was then placed in a bottle and washed with a 10% dilution of bleach. Under sterile conditions, the root solution was then poured through sieves (60 count sieve on top, 500 count sieve on the bottom). The crude egg collection was collected from the bottom of the 500 count sieve into 5 mL each of bleach and egg mixture in 15 mL Falcon tubes. 5 mL of 70% sucrose solution was then placed in each Falcon tube. A 1 mL layer of double distilled sterile water was then gently placed on top of the sucrose mixtures in each Falcon tube. The samples were then centrifuged for 5 minutes at 1200 rpm. The embryos that were suspended between the sucrose solution and the 1 mL water layer were collected in a total of 3 mL (top layer of 3 mL of the solution) from each Falcon tube into fresh 15 mL Falcon tubes. 10 mL of a 5% bleach solution was added and the eggs were vortexed for 10 minutes. The Falcon tubes were then centrifuged for 5 minutes at 2000 rpm. The supernatant was then removed, and the eggs were rinsed in 10 mL of sterile double distilled water and re-centrifuged for 5 minutes at 2000 rpm. This process was repeated two more times. After the last wash, 5 mL of supernatant was removed, while the remaining 5 mL of water was mixed with the eggs and placed into a 5 mL Petri dish. The eggs were then placed in an incubator at 25-27° C., and juvenile worms (J2 stage) hatched after about 10 days. The worms were kept in a 25-27° C. incubator for storage.

B) Preparation of Testing Solutions and Placement of Nematodes

The chalcone to be tested was placed in a 1.5 mL eppendorf tube, and 1 mL of dimethyl sulfoxide (DMSO)

was added to make a $10^{-1}$ M solution. This stock solution was used for further dilutions in sterile double distilled water ($10^{-4}$ M to $10^{-5}$ M). For instance, 10 μL of $10^{-1}$ M chalcone in DMSO solution was added to 9990 μL of sterile double distilled water to make a $10^{-4}$ M solution for assays with the nematodes. 100 μL of the dilutions in water were pipetted into 30 wells of a 96 well plate and one worm was transferred into each well from a stock of extracted J2 *M. incognita*. For a negative control, to confirm that the concentration of DMSO was not killing the nematodes, 30 worms were placed in 100 μL of 1% DMSO in sterile double distilled water for each experiment (past work has demonstrated that *C. elegans* worms can survive at this concentration of DMSO (Attar et al., 2011).

C) Monitoring Nematodes

The bioassay is designed to test the ability of the peptides, and chalcones, to kill the worms (% mortality). Each test was performed in a 96-well plate with one nematode in each well (30 wells total). The nematodes were incubated in the treatment solutions for 5 days. Viability of the nematodes was tested under a dissecting microscope by examining each for movement after disturbance with a probe.

D) Egg Hatching Experiments

The bioassay is designed to test the ability of the mixture of peptides and chalcone to prevent egg hatching (% unhatched eggs). Each test was performed in a 96-well plate with 10 eggs per well. The eggs were incubated in each treatment for 16 days. Hatched vs unhatched eggs were determined by microscopic images.

EXAMPLE 2

Efficacy of Nematicidal Composition Comprising of Peptides and Chalcones

As described earlier, equal number nematodes were incubated in various treatment solutions in a 96-well plate for 5 days and the potency of different combination of nematicides was tested by counting the number of nematodes dead or surviving on Day 5. Similarly, the effect of different combination of nematicide composition on hatching of nematode eggs was also counted.

As depicted in FIG. 1-6, incubation of J2 stage juvenile nematodes in water, or 1% DMSO caused death of 10-15% nematodes on Day 5, and these treatments served as negative controls. Whereas, incubation of juvenile nematodes in a chemical mixture comprising of chlorpyriphos and imidacloprid (1:1 ratio) resulted in around 50% death on Day 5 which served as a positive control. Treatment of nematodes with chalcone 17, chalcone 25, or chalcone 30 alone in concentration between $10^{-4}$-$10^{-5}$ M caused between 70-85% death of juvenile nematodes.

Figure 7:
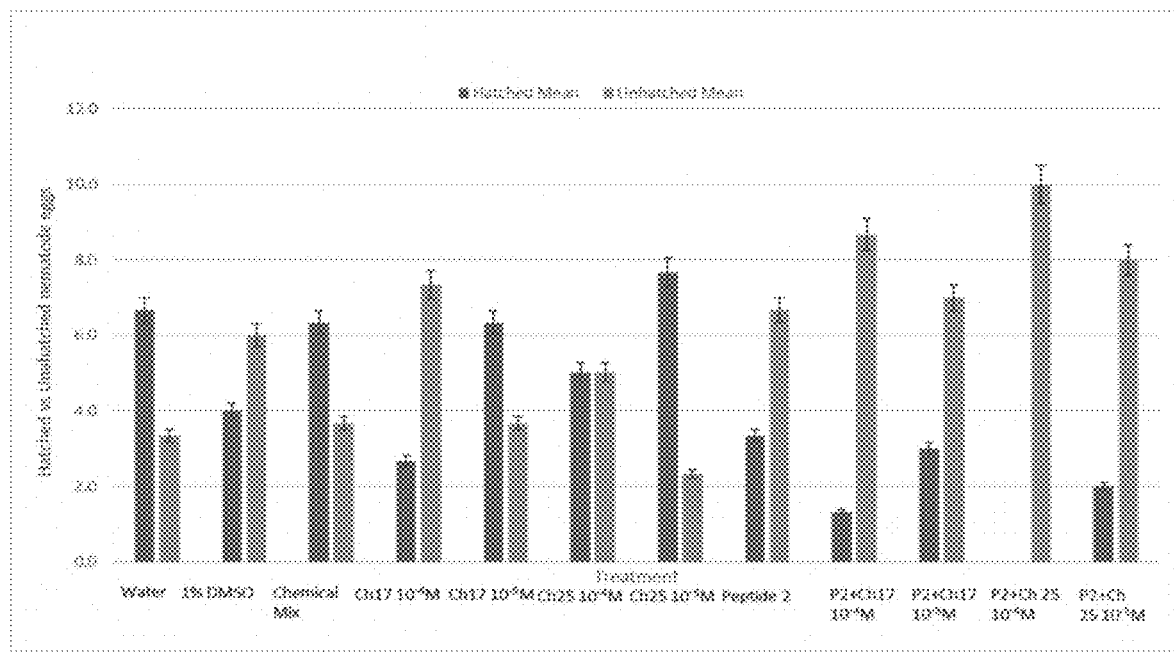
FIG. 7 depicts a graphical representation of Peptide 2 alone or in combination with chalcones on hatching of eggs of nematodes in a 96-well plate experiment.
Figure 8:
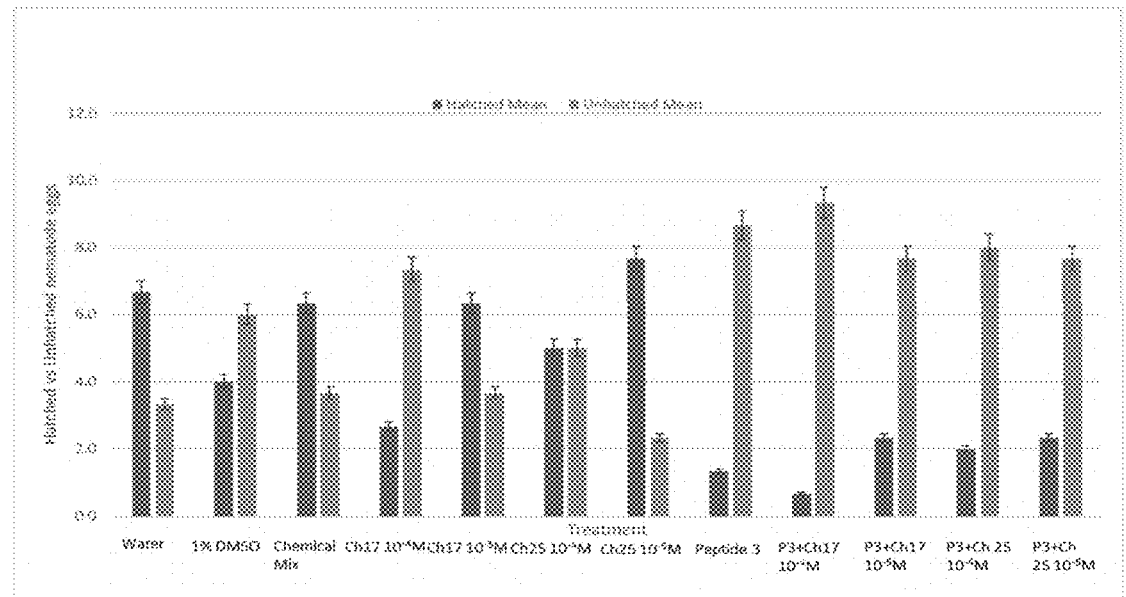
FIG. 8 depicts a graphical representation of Peptide 3 alone or in combination with chalcones on hatching of eggs of nematodes in a 96-well plate experiment.
Figure 9:
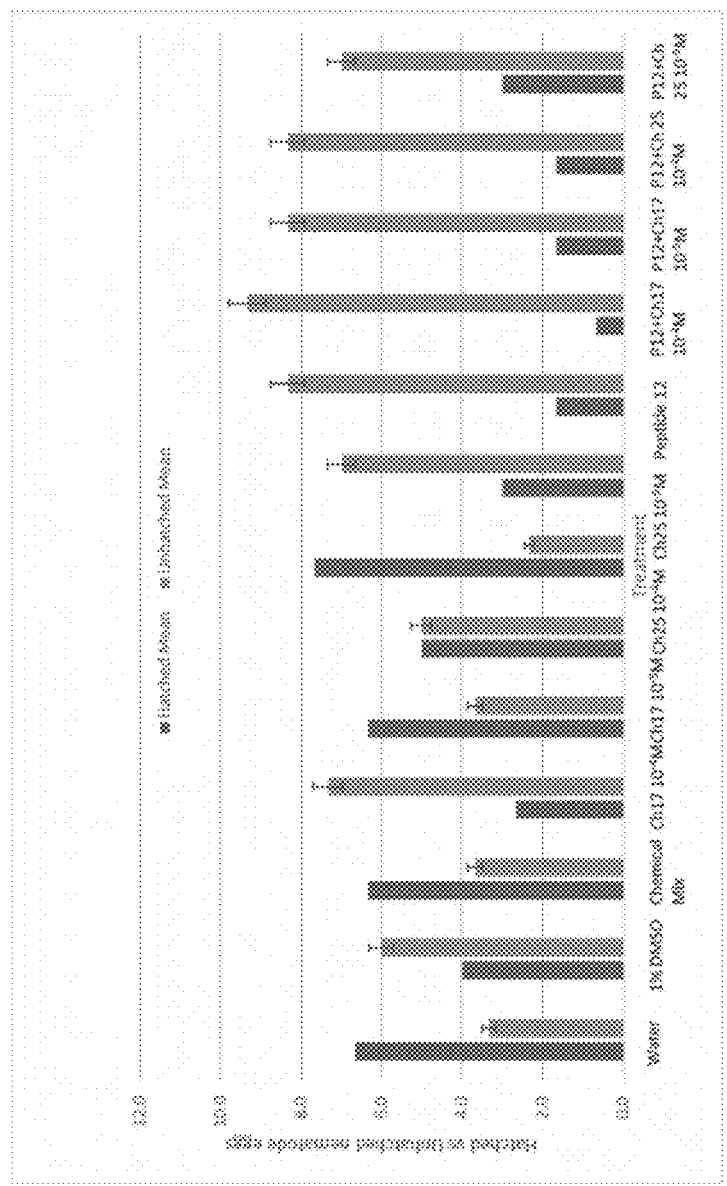
FIG. 9 depicts a graphical representation of Peptide 12 alone or in combination with chalcones on hatching of eggs of nematodes in a 96-well plate experiment.

Similarly, as depicted in FIG. 7, FIG. 8 and FIG. 9, incubation of eggs in water resulted in hatching of 70% of the eggs which was used as a negative control. Treatment of nematode eggs with either chalcone 17 or chalcone 25 at a concentration of $10^{-4}$-$10^{-5}$ M caused around only 50% of hatched eggs by Day 16.

Figure 2:
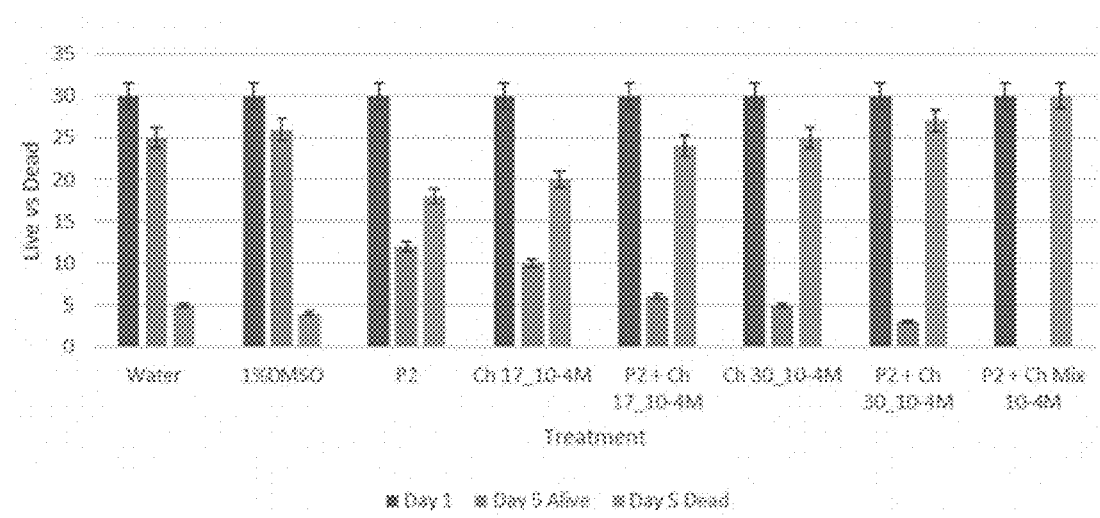
FIG. 2 depicts a graphical representation of effect of Peptide 2 in combination with chalcone 30 on nematodes in a 96-well plate experiment.

As depicted in FIGS. 1 and 2, incubation of juvenile nematodes with Peptide 2 alone at a concentration of 0.8 mg/ml resulted in around 60-80% death on Day 5. However, the combination of Peptide 2 with either chalcone 17, chalcone 25, or chalcone 30 resulted in nearly 100% death of juvenile nematodes on Day 5, wherein the concentration of the peptide was 0.8 mg/ml and the concentration of the chalcones was as low as $10^{-4}$-$10^{-5}$ M. Moreover, as depicted in FIG. 2, the combination of Peptide 2 (0.8 mg/ml), and chalcone 17 and chalcone 30 at a ratio of 1:1 with a concentration of $10^{-4}$-$10^{-5}$ M was highly effective.

Figure 3:
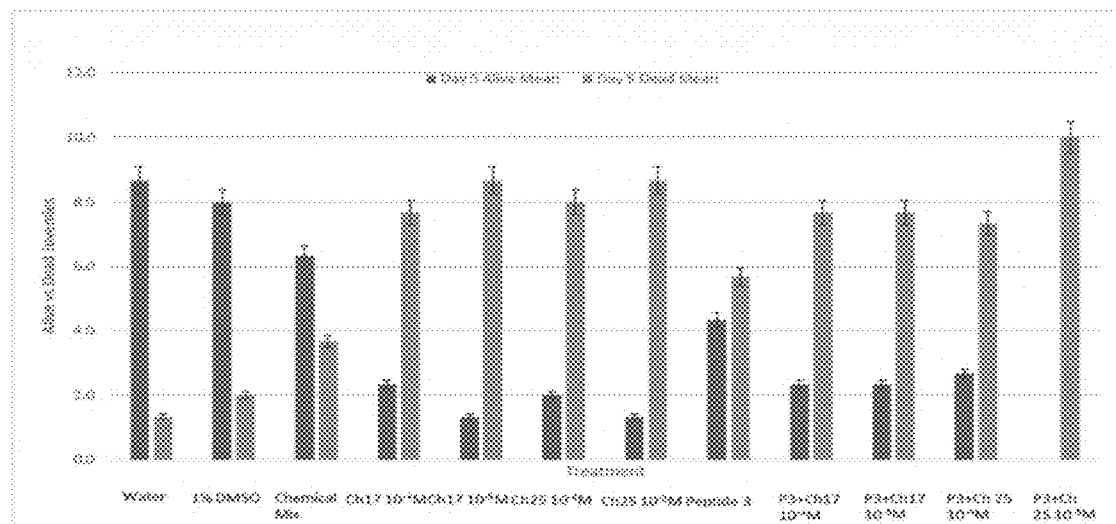
FIG. 3 depicts a graphical representation of effect of Peptide 3 in combination with chalcone 17, or chalcone 25 on nematodes in a 96-well plate experiment.
Figure 4:
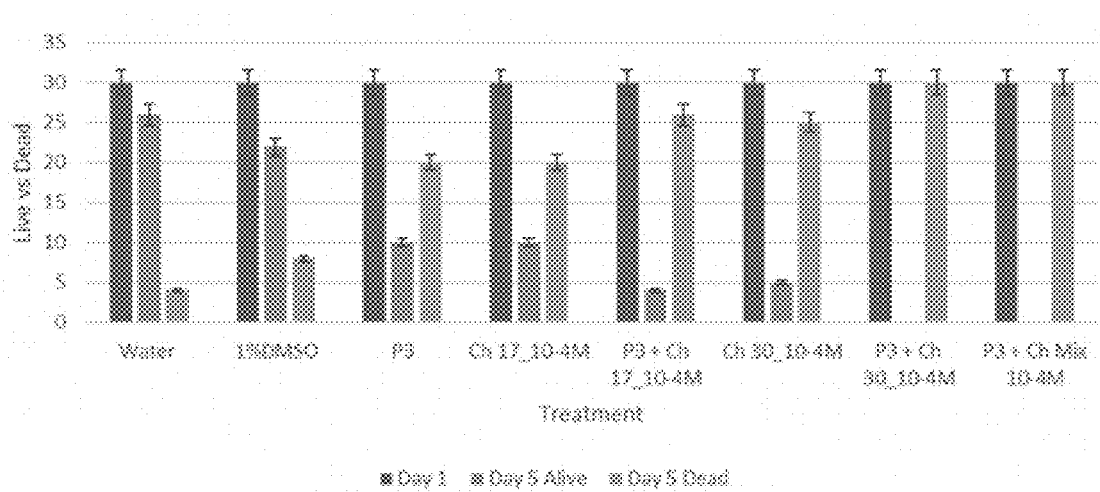
FIG. 4 depicts a graphical representation of effect of Peptide 3 in combination with chalcone 30 on nematodes in a 96-well plate experiment.

Similarly, FIGS. 3 and 4 depict that Peptide 3 alone is less effective in killing juvenile nematodes as compared to its combination with chalcones. In case of Peptide 3, the combination with chalcone 25 or chalcone 30 is more effective than combination with chalcone 17. Moreover, as depicted in FIG. 4, the combination of Peptide 3 (0.8 mg/ml), and chalcone 17 and chalcone 30 at a ratio of 1:1 with a concentration of $10^{-4}$-$10^{-5}$ M was immensely effective.

Figure 5:
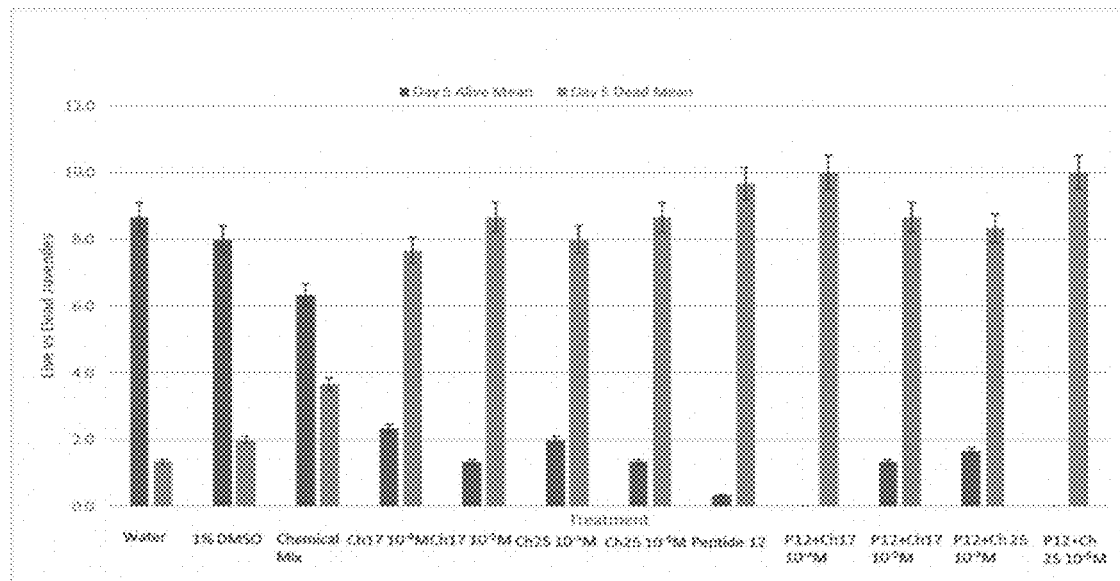
FIG. 5 depicts a graphical representation of effect of Peptide 12 in combination with chalcone 17, or chalcone 25 on nematodes in a 96-well plate experiment.
Figure 6:
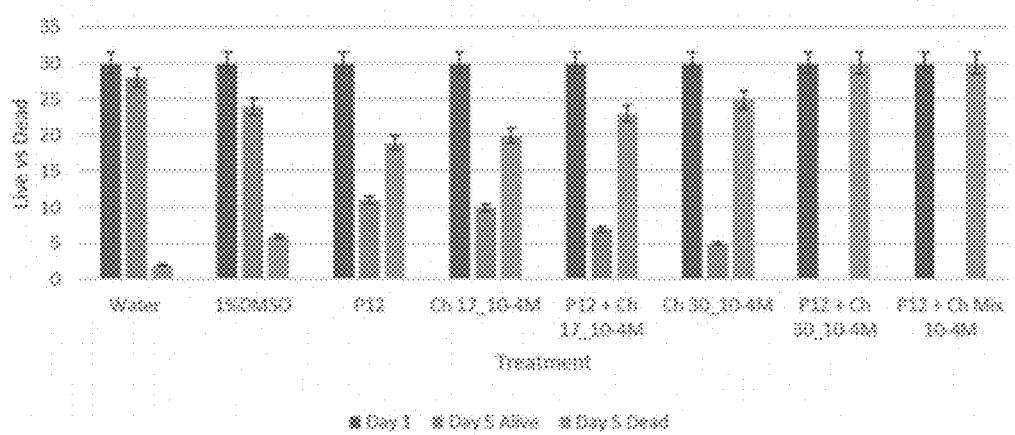
FIG. 6 depicts a graphical representation of effect of Peptide 12 in combination with chalcone 30 on nematodes in a 96-well plate experiment.

FIGS. 5 and 6 depict that Peptide 12 alone at a concentration of 0.8 mg/ml is highly effective in killing juvenile nematodes, nevertheless, the combination of the peptide with at least one chalcone significantly enhances the potency of the nematicide composition.

As depicted in FIG. 7, the treatment of nematode eggs with Peptide 2 at 0.8 mg/ml concentration caused around 30% of hatched eggs by Day 16, whereas, the combination of Peptide 2 (0.8 mg/ml) and chalcone ($10^{-4}$-$10^{-5}$ M) resulted in 10-25% of hatched eggs by Day 16.

As depicted in FIG. 8, the treatment of nematode eggs with Peptide 3 at 0.8 mg/ml concentration caused around 10% of hatched eggs by Day 16, whereas, the combination of Peptide 3 (0.8 mg/ml) and chalcone ($10^{-4}$-$10^{-5}$ M) resulted in 10-20% of hatched eggs by Day 16.

As depicted in FIG. 9, the treatment of nematode eggs with Peptide 12 at 0.8 mg/ml concentration caused around 20% of hatched eggs by Day 16, whereas, the combination of Peptide 12 (0.8 mg/ml) and chalcone ($10^{-4}$-$10^{-5}$ M) resulted in 10-15% of hatched eggs by Day 16.

These results further suggest that the peptides, Peptide 2 or Peptide 3, or Peptide 12, derived from CED-4 protein, and chalcones have efficient nematicidal activities and have the ability of killing the nematodes and also destroying their eggs.

However, the combination of these peptides with chalcones, specifically, with chalcone 30 showed severe synergistic effect on killing nematodes.

These results suggest that the combination of nematicidal peptides, Peptide 2 or Peptide 3, or Peptide 12 at a concentration of 0.8 mg/ml, with chalcones, either chalcone 17, chalcone 25, or chalcone 30 at a concentration as low as $10^{-4}$-$10^{-5}$ M has a synergistic effect on killing nematodes and are highly potent as nematicidal compositions.

We claim:

1. A composition for controlling parasitic nematodes comprising:
    an effective amount of at least one peptide derived from CED-4 protein comprising an amino acid sequence selected from the group consisting of SEQ ID NO. 2; SEQ ID NO. 3; SEQ ID NO. 4;
    and
    b) an effective amount of at least one compound of Formula 1

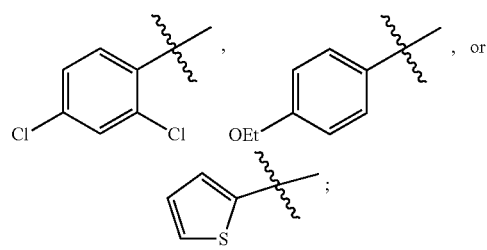

wherein,
ring A is

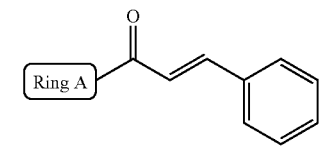, 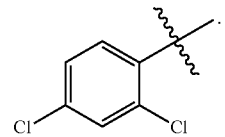 [SMILES: *c1ccc(Cl)cc1Cl], or

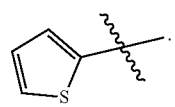;

wherein,
the composition has synergistic anti-nematode efficacy of 100% at concentration of the peptide about 0.8 mg/ml, and compound of Formula 1 about $10^{-5}$-$10^{-6}$ M.

2. The composition as claimed in claim 1, wherein, the composition comprises of peptide consisting of amino acid sequence of SEQ ID NO. 2 having a length of 15 amino acids.

3. The composition as claimed in claim 1, wherein, the composition comprises of peptide consisting of amino acid sequence of SEQ ID NO. 3 having a length of 16 amino acids.

4. The composition as claimed in claim 1, wherein, the composition comprises of peptide consisting of amino acid sequence of SEQ ID NO. 4 having a length of 12 amino acids.

5. The composition as claimed in claim 1, wherein the composition further comprises at least one extender, an emulsifier and/or surfactant.

6. The composition as claimed in claim 1, wherein the composition further comprises at least one agrochemically active compound.

7. The composition as claimed in claim 6, wherein said agrochemically active compound is selected from but not limited to substances capable of treating plants, fungicides, bactericides, insecticides, acaricides, nematicides, molluscicides, safeners, plant growth regulators, plant nutrients and biological control agents.

8. The composition as claimed in claim 1, wherein, the composition comprises a peptide consisting of an amino acid sequence of SEQ ID NO. 2 and a compound of

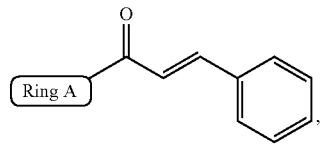   Formula 1 wherein ring A is

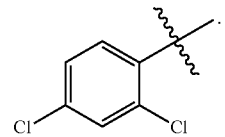 [SMILES: *c1ccc(Cl)cc1Cl]

9. The composition as claimed in claim 1, wherein, the composition comprises a peptide consisting of an amino acid sequence of SEQ ID NO. 2 and a compound of

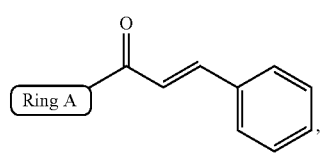   Formula 1 wherein ring A is

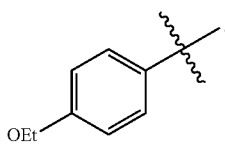

10. The composition as claimed in claim 1, wherein, the composition comprises a peptide consisting of an amino acid sequence of SEQ ID NO. 2 and a compound of

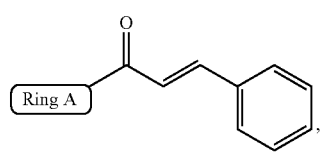   Formula 1 wherein ring A is

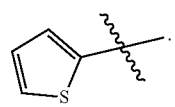

11. The composition as claimed in claim 1, wherein, the composition comprises a peptide consisting of an amino acid sequence of SEQ ID NO. 3 and a compound of

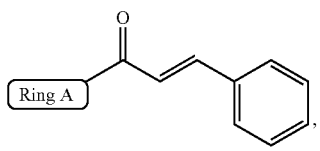

Formula 1 wherein ring A is

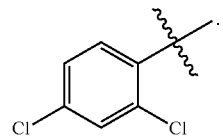 [SMILES: *c1ccc(Cl)cc1Cl]

12. The composition as claimed in claim 1, wherein, the composition comprises a peptide consisting of an amino acid sequence of SEQ ID NO. 3 and a compound of

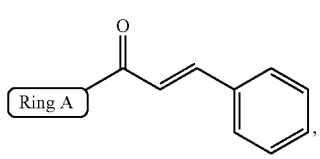

Formula 1 wherein ring A is

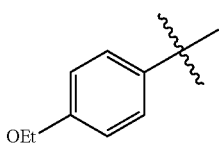

13. The composition as claimed in claim 1, wherein, the composition comprises a peptide consisting of an amino acid sequence of SEQ ID NO. 3 and a compound of

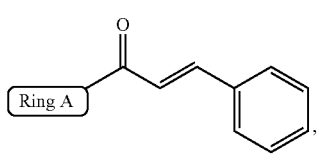

Formula 1 wherein ring A is

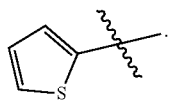 [SMILES: *c1cccs1]

14. The composition as claimed in claim 1, wherein, the composition comprises a peptide consisting of an amino acid sequence of SEQ ID NO. 4 and a compound of

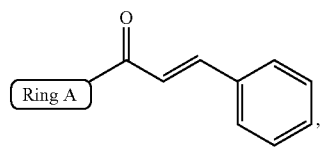

Formula 1 wherein ring A is

15. The composition as claimed in claim 1, wherein, the composition comprises a peptide consisting of an amino acid sequence of SEQ ID NO. 4 and a compound of

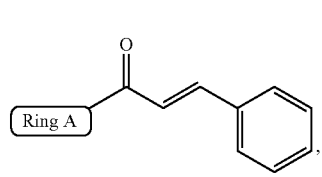

Formula 1 wherein ring A is

16. The composition as claimed in claim 1, wherein, the composition comprises a peptide consisting of an amino acid sequence of SEQ ID No. 4 and a compound of

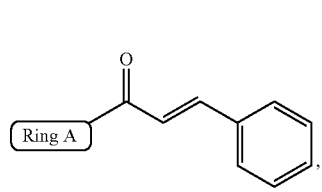

Formula 1 wherein ring A is

* * * * *

SEQUENCE LISTING

<160> NUMBER OF SEQ ID NOS: 4

<210> SEQ ID NO 1
<211> LENGTH: 549
<212> TYPE: PRT

<213> ORGANISM: Caenorhabditis elegans

<400> SEQUENCE: 1

```
Met Leu Cys Glu Ile Glu Cys Arg Ala Leu Ser Thr Ala His Thr Arg
1               5                   10                  15

Leu Ile His Asp Phe Glu Pro Arg Asp Ala Leu Thr Tyr Leu Glu Gly
            20                  25                  30

Lys Asn Ile Phe Thr Glu Asp His Ser Glu Leu Ile Ser Lys Met Ser
        35                  40                  45

Thr Arg Leu Glu Arg Ile Ala Asn Phe Leu Arg Ile Tyr Arg Arg Gln
    50                  55                  60

Ala Ser Glu Leu Gly Pro Leu Ile Asp Phe Asn Tyr Asn Asn Gln
65                  70                  75                  80

Ser His Leu Ala Asp Phe Leu Glu Asp Tyr Ile Asp Phe Ala Ile Asn
            85                  90                  95

Glu Pro Asp Leu Leu Arg Pro Val Val Ile Ala Pro Gln Phe Ser Arg
            100                 105                 110

Gln Met Leu Asp Arg Lys Leu Leu Gly Asn Val Pro Lys Gln Met
            115                 120                 125

Thr Cys Tyr Ile Arg Glu Tyr His Val Asp Arg Val Ile Lys Lys Leu
    130                 135                 140

Asp Glu Met Cys Asp Leu Asp Ser Phe Phe Leu Phe Leu His Gly Arg
145                 150                 155                 160

Ala Gly Ser Gly Lys Ser Val Ile Ala Ser Gln Ala Leu Ser Lys Ser
            165                 170                 175

Asp Gln Leu Ile Gly Ile Asn Tyr Asp Ser Ile Val Trp Leu Lys Asp
            180                 185                 190

Ser Gly Thr Ala Pro Lys Ser Thr Phe Asp Leu Phe Thr Asp Ile Leu
    195                 200                 205

Leu Met Leu Lys Ser Glu Asp Asp Leu Leu Asn Phe Pro Ser Val Glu
210                 215                 220

His Val Thr Ser Val Val Leu Lys Arg Met Ile Cys Asn Ala Leu Ile
225                 230                 235                 240

Asp Arg Pro Asn Thr Leu Phe Val Phe Asp Asp Val Val Gln Glu Glu
            245                 250                 255

Thr Ile Arg Trp Ala Gln Glu Leu Arg Leu Arg Cys Leu Val Thr Thr
            260                 265                 270

Arg Asp Val Glu Ile Ser Asn Ala Ala Ser Gln Thr Cys Glu Phe Ile
    275                 280                 285

Glu Val Thr Ser Leu Glu Ile Asp Glu Cys Tyr Asp Phe Leu Glu Ala
290                 295                 300

Tyr Gly Met Pro Met Pro Val Gly Glu Lys Glu Glu Asp Val Leu Asn
305                 310                 315                 320

Lys Thr Ile Glu Leu Ser Ser Gly Asn Pro Ala Thr Leu Met Met Phe
            325                 330                 335

Phe Lys Ser Cys Glu Pro Lys Thr Phe Glu Lys Met Ala Gln Leu Asn
            340                 345                 350

Asn Lys Leu Glu Ser Arg Gly Leu Val Gly Val Glu Cys Ile Thr Pro
        355                 360                 365

Tyr Ser Tyr Lys Ser Leu Ala Met Ala Leu Gln Arg Cys Val Glu Val
    370                 375                 380

Leu Ser Asp Glu Asp Arg Ser Ala Leu Ala Phe Ala Val Val Met Pro
385                 390                 395                 400
```

```
Pro Gly Val Asp Ile Pro Val Lys Leu Trp Ser Cys Val Ile Pro Val
                405                 410                 415

Asp Ile Cys Ser Asn Glu Glu Gln Leu Asp Asp Glu Val Ala Asp
            420                 425                 430

Arg Leu Lys Arg Leu Ser Lys Arg Gly Ala Leu Leu Ser Gly Lys Arg
        435                 440                 445

Met Pro Val Leu Thr Phe Lys Ile Asp His Ile His Met Phe Leu
    450                 455                 460

Lys His Val Val Asp Ala Gln Thr Ile Ala Asn Gly Ile Ser Ile Leu
465                 470                 475                 480

Glu Gln Arg Leu Leu Glu Ile Gly Asn Asn Asn Val Ser Val Pro Glu
                485                 490                 495

Arg His Ile Pro Ser His Phe Gln Lys Phe Arg Arg Ser Ser Ala Ser
                500                 505                 510

Glu Met Tyr Pro Lys Thr Thr Glu Thr Val Ile Arg Pro Glu Asp
            515                 520                 525

Phe Pro Lys Phe Met Gln Leu His Gln Lys Phe Tyr Asp Ser Leu Lys
                530                 535                 540

Asn Phe Ala Cys Cys
545

<210> SEQ ID NO 2
<211> LENGTH: 15
<212> TYPE: PRT
<213> ORGANISM: Caenorhabditis elegans

<400> SEQUENCE: 2

Asp Leu Leu Arg Pro Val Val Ile Ala Pro Gln Phe Ser Arg Gln
1               5                   10                  15

<210> SEQ ID NO 3
<211> LENGTH: 19
<212> TYPE: PRT
<213> ORGANISM: Caenorhabditis elegans

<400> SEQUENCE: 3

Arg Gln Met Leu Asp Arg Lys Leu Leu Leu Gly Asn Val Pro Lys Gln
1               5                   10                  15

Met Thr Cys

<210> SEQ ID NO 4
<211> LENGTH: 12
<212> TYPE: PRT
<213> ORGANISM: Caenorhabditis elegans

<400> SEQUENCE: 4

Phe Pro Lys Phe Met Gln Leu His Gln Lys Phe Tyr
1               5                   10
```